United States Patent [19]

Hikida et al.

[11] Patent Number: 4,468,589

[45] Date of Patent: Aug. 28, 1984

[54] LOW SPEED ELECTRON EXCITED FLUORESCENT MATERIAL AND FLUORESCENT DISPLAY TUBE

[75] Inventors: Chuichi Hikida; Tatsuo Yamaura; Yuuzi Nomura, all of Mobara, Japan

[73] Assignee: Futaba Denshi Kogyo Kabushiki Kaisha, Mobara, Japan

[21] Appl. No.: 407,948

[22] Filed: Aug. 13, 1982

[30] Foreign Application Priority Data

Sep. 1, 1981 [JP] Japan ................................ 56-138202

[51] Int. Cl.$^3$ ...................... H01J 63/06; C09K 11/46
[52] U.S. Cl. ............................. 313/496; 252/301.6 R
[58] Field of Search ............................. 313/496, 495; 252/301.6 R

[56] References Cited

U.S. PATENT DOCUMENTS

| 2,921,201 | 1/1960 | Lieb | 252/301.6 R |
| 3,846,662 | 11/1974 | Hooker | 313/496 |
| 4,430,598 | 2/1984 | Okada et al. | 313/495 X |

*Primary Examiner*—Palmer C. Demeo
*Attorney, Agent, or Firm*—Oblon, Fisher, Spivak, McClelland & Maier

[57] ABSTRACT

A low speed electron excited fluorescent material is disclosed comprising a ZuO:Zn fluorescent component excited by low speed electrons to emit light and an additive component selected from the group consisting of W, Mo, V and their oxides, and capable of emitting light of a uniform luminance and exhibiting improved temperature characteristics. A fluorescent display tube is also disclosed using such fluorescent material.

5 Claims, 6 Drawing Figures

4,468,589

LOW SPEED ELECTRON EXCITED FLUORESCENT MATERIAL AND FLUORESCENT DISPLAY TUBE

BACKGROUND OF THE INVENTION

1. Field of the Invention

This invention relates to a low speed electron excited fluorescent material and a fluorescent display tube using such fluorescent material, and more particularly to a low speed electron excited fluorescent material which is improved in luminance, decreased in unevenness of luminance amd has excellent temperature characteristics, and a fluorescent display tube using such fluorescent material.

2. Description of the Prior Arts

Conventionally, a ZnO:Zn system fluorescent material has been widely known as a fluorescent material excited by a low speed electron ray accelerated with a voltage lower than 100 V to emit light. The ZnO:Zn system fluorescent material has been widely used as a fluorescent material for, for example, a fluorescent display tube, because it has several advantages in use such as, for example, of having a luminous threshold voltage of as low as 1-2 V and emitting light of a sufficient luminance with a voltage of as low as ten-odd V.

In addition, a fluorescent display tube manufactured using such low speed electron excited fluorescent material can be driven directly by a LSI due to its low voltage drivability and less power consumption. Also, the fluorescent display tube is of a self-light emitting type and provides color displays of green which can be easily observed. Thus, the fluorescent display tube has been extensively used for display systems in acoustic units and vehicles as well as in various types of electrical and electronic devices.

In the excitation of a fluorescent material with low speed electrons to allow the fluorescent material to emit light, the electrons impinging on the fluorescent material rarely penetrate into particles of the fluorescent material. And, it is observed that the electrons penetrate into the fluorescent material in depth as little as several to several tens Å at most and luminescence of the fluorescent material takes place substantially on the surface thereof.

Thus, it is believed that the surface characteristics of the fluorescent material largely affects the luminous performance.

However, a fluorescent display device using such fluorescent material, for example, a fluorescent display tube is manufactured through various steps such as calcining, encapsulating, evacuating and the like. This results in the fluorescent material being exposed to various severe environments to cause the surface of the fluorescent material to easily undergo contamination, and various changes such as change in quality and the like.

This causes the fluorescent display tube manufactured to provide ununiform and/or insufficient luminous display. In particular, under the present circumstances that the fluorescent display tube is extensively applied to various fields such as a vehicle and the like as mentioned above, it is obliged to be often used in such a manner that it is exposed directly to the sunlight. This requires the fluorescent display tube to provide a display of luminance as high as possible, therefore, it is highly desired to avoid the lowering of luminance of the fluorescent material due to the contamination of the surface thereof.

In addition, the fluorescent material generally has a property that it is decreased in luminance when it is subjected to a high temperature for a long time. The luminance of the fluorescent material is also decreased at the operation under a high temperature due to the phenomenum that the luminance is attenuated by a high temperature. Thus, it is desired that the fluorescent material has luminous characteristics which are not adversely affected by such factors as mentioned above and good temperature characteristics.

BRIEF SUMMARY OF THE INVENTION

The present invention has been made in view of the foregoing disadvantages in the prior art.

Accordingly, it is an object of the present invention to provide a low speed electron excited fluorescent material which is substantially improved in luminance, is capable of emitting light of a uniform luminance and has excellent temperature characteristics.

It is another object of the present invention to provide a low speed electron excited fluorescent material which is also improved in luminous contrast.

It is a further object of the present invention to provide a fluorescent display tube using such fluorescent material which is capable of exhibiting excellent luminous characteristics.

In accordance with one aspect of the present invention, there is provided a low speed electron excited fluorescent material comprising a ZnO:Zn fluorescent component excited by low speed electrons to emit luminous light of green and at least one additive component selected from the group consisting of tungsten (W), molybdenum (Mo), vanadium (V) and their oxides which is added to the fluorescent component. The addivitive component may be added to the fluorescent component in amount of 0.1-50 wt.% based on the fluorescent component.

In accordance with another aspect of the present invention, there is provided a fluorescent display tube comprising an anode having a fluorescent material layer deposited on the upper surface thereof and a filamentary cathode for emitting electrons which impinge on the fluorescent material to allow it to edit luminous light, wherein the fluorescent material layer is composed of a ZnO:Zn fluorescent component excited by low speed electrons impinging thereon to emit light and at least one additive component selected from the group of consisting of W, Mo, V and their oxides which is added to the fluorescent component.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENTS

Figure 1:
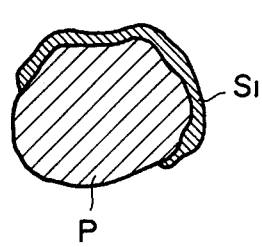
FIGS. 1 to 4 are schematic views illustrating processes of preparing a low speed electron excited fluorescent material according to the present invention, respectively.

Prior to the explanation of embodiments of the present invention with reference to the accompanying drawings, an additive component to be added to a ZnO:Zn fluorescent component in the present invention will be first explained.

As explained hereinbefore, the luminescence of a fluorescent material due to the excitation by low speed electrons substantially takes place on the surface thereof. This means that a contamination or a change in property due to the contamination which the surface of the fluorescent material undergoes adversely affect the luminous characteristics of the fluorescent material. Thus, it is desired that the fluorescent material has a surface as clean as possible. However, there is a fear that when a fluorescent display device such as a fluorescent display tube is manufactured using the fluorescent material, the surface of the fluorescent material undergoes such contamination or change in quality in the manufacturing process. In such case, when such contamination is ultimately removed from the surface, the luminous characteristics of the fluorescent material is not adversely affected.

Surprisingly, as a result of the inventor's research and experiments, it has now been found that W, Mo, V and their oxides are quite useful as a material for removing a contamination on the surface of a ZnO:Zn fluorescent material therefrom.

The reasons why these materials are effective to clean the surface of the fluorescent material have not been theoretically clarified, however, it appears that these materials are useful for this purpose for the following reasons.

It appears that $H_2O$, $CO_2$ and the like generated in the manufacture of a fluorescent display device and/or entering into the display device from an ambient atmosphere during the manufacturing process are chemically bonded to a ZnO:Zn fluorescent material on the surface thereof to form a contamination. It has been found that when the ZnO:Zn fluorescent material is added thereto an additive such as, for example, $WO_3$ which is one of tungsten oxides, such contamination is substantially removed from the fluorescent material. This will be due to $WO_3$ acting as a sort of getter. More particularly, it appears that $WO_3$ serves to effectively absorb thereon $H_2O$ chemically bonded to the fluorescent material and also serves to decompose $CO_2$ chemically bonded to Zn to remove it from the fluorescent material, to thereby clean the surface thereof. Further experiments made by the inventor have clearly shown that W; tungsten oxides other than $WO_3$ such as WO, $WO_2$, $W_2O_3$ and the like; and Mo, V and their oxides also serve to clean the surface of the ZnO:Zn fluorescent material in the substantially same manner as $WO_3$.

Thus, it will be noted that the above-mentioned objects of the present invention may be effectively accomplished by a low electron excited fluorescent material comprising a ZnO:Zn fluorescent component and at least one additive component selected from the group consisting of W, Mo, V and their oxides which is added to the fluorescent component and by a fluorescent display tube using such fluorescent material.

It is not always required that the additive component is initially added in the form of a simple substance or its oxide to the fluorescent component. It is merely necessary to allow the additive component to be ultimately contained in the fluorescent component. For example, the additive component may be added to the fluorescent material through any step such as, for example, a heating step in the manufacture of a fluorescent display tube. The optimum amount of such additive component to be contained in the fluorescent material depends upon a manner of adding the additive component, the size and shape of the fluorescent component, and the like.

A fluorescent material of the present invention will be detailedly explained hereinafter with reference to FIGS. 1 to 4 in which $WO_3$ is used as the additive component.

It has been found by an inventor's experiment that, in the case of depositing a film $S_1$ of $WO_3$ on the surface of a particle of a ZnO:Zn fluorescent component as shown in FIG. 1 according to any suitable conventional chemical or physical procedure to form a fluorescent material of the present invention; the fluorescent material starts to be improved in luminous characteristics at a $WO_3$ content of as low as about 0.1 wt.% based on the fluorescent component particles, and the fluorescent material is maximized in luminance at a $WO_3$ content between 0.5 wt.% and 1 wt.%. However, when the $WO_3$ content exceeds about 3 wt.% based on the fluorescent component, the fluorescent material is darkened to cause the luminance to be somewhat decreased. Thus, in the embodiment of FIG. 1, the additive component is preferably added to the fluorescent component in amount of 0.1 to 3 wt.% based on the fluorescent component when only the luminous characteristics of the fluorescent material is considered.

Figure 2:
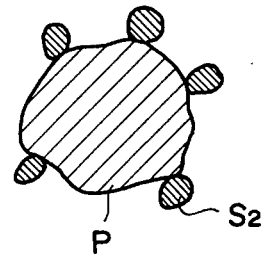

Further, it has been found that when, as shown in FIG. 2, mixing a powder $S_2$ of finely divided $WO_3$ having a particle size of, for example, 1 μm or less in a particle P of a ZnO:Zn fluorescent component to adhere the powder $S_2$ to the particle P to prepare a fluorescent material of the present invention, it is improved in luminance at a $WO_3$ content of 0.5 to 5 wt.%. However, the $WO_3$ content exceeding 5 wt.% based on the fluorescent component causes the fluorescent material to be darkened, resulting in the luminance being somewhat decreased. Aos, the $WO_3$ content below 3 wt.% does not allow the fluorescent material to be significantly improved in luminance. Thus, when a finely divided $WO_3$ powder of 1 μm or less in particle size is added to the fluorescent component, the $WO_3$ content is preferably kept in the range of 0.5 to 5 wt.% based on the fluorescent component.

Figure 3:
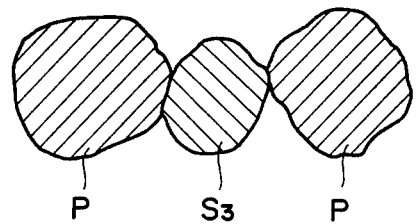

Furthermore, it has been found that, in the case of adding a $WO_3$ powder of, for example, about 5 μm in average particle size to a ZnO:Zn fluorescent component to prepare a fluorescent material of the present invention as shown in FIG. 3, the fluorescent material is improved in luminance at a $WO_3$ content of 1 to 20 wt.%. However, the $WO_3$ content of the fluorescent component exceeds 20 wt.% based on the fluorescent component, the fluorescent material prepared is not increased in luminance because a surface area of the fluorescent material occupied by the $WO_3$ which does not have a luminous property in nature becomes large.

As seen from the foregoing, the optimum $WO_3$ content of the fluorescent component which allows the fluorescent material to be improved in luminance depends upon the particle size of WO₃ to be added, a manner of adding WO₃ and the like. However, the WO₃ additive component is preferably added in amount of 0.1 to 20 wt.% to the ZnO:Zn fluorescent component.

However, it has been found that an improvement in temperature characteristics of the fluorescent material can ben substantially accomplished at a WO₃ content in the range of 30 to 50 wt.% as well as 0.1 to 20 wt.%, as explained in detail hereinafter. In addition, although the WO₃ content above 20 wt.% causes the surface of the fluorescent material to be darkened as mentioned above, it has been also found that this can be effectively utilized to improve the luminous contrast of the fluorescent material.

More particularly, when the surface of the fluorescent material is darkened by keeping the WO₃ content of the fluorescent component in the range of not significantly decreasing the luminance of the fluorescent material or below 50 wt.% and the surface of a substrate on which a layer of the fluorescent material is to be deposited is darkened by a material with a color similar to the surface of the fluorescent material; the portion of the fluorescent layer which does not emit light is never observed from the outside, because the non-light emitting portion is darkened and has a color similar to the surrounding substrate to thereby be indistinguishable from the substrate. Thus, the fluorescent material can be sufficiently increased in luminous contrast between the non-light emitting portion and the light emitting portion, resulting in the visibility being substantially increased.

As explained above, the large WO₃ content of the fluorescent component substantially contributes to improve in luminous contrast of the fluorescent material, although it causes the fluorescent material to be somewhat decreased in luminance. Thus, it will be noted that the WO₃ additive component is preferably added in the amount of 0.1 to 50 wt.% to the fluorescent component.

Figure 4:
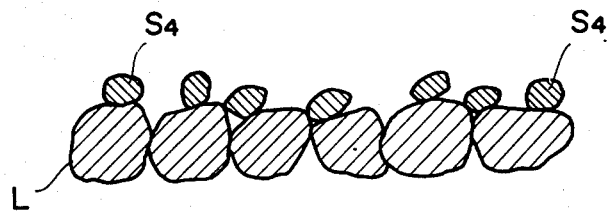

In the embodiments shown in FIGS. 1 to 3, the additive component is previously added to the particle of the fluorescent component. However, the additive component may be added at any step in the manufacture of a fluorescent display device, as metnioned hereinbefore. For example, as shown in FIG. 4, the additive component may be added in such a manner that a fluorescent layer L is first formed on a substrate or an electrode and then a powder S₄ of WO₃ is added onto the surface of the fluorescent layer.

In the embodiments shown in FIGS. 1 to 4, WO₃ is used as the additive component. However, it is of course that W; tungsten oxides other than WO₃; and Mo, V and their oxides are added to the ZnO:Zn fluorescent component in the substantially same manner as WO₃ to effectively act as the additive component of the present invention.

Now, a fluorescent display tube according to the present invention will be explained hereinafter which uses the low speed electron excited fluorescent material of the present invention.

Figure 5:
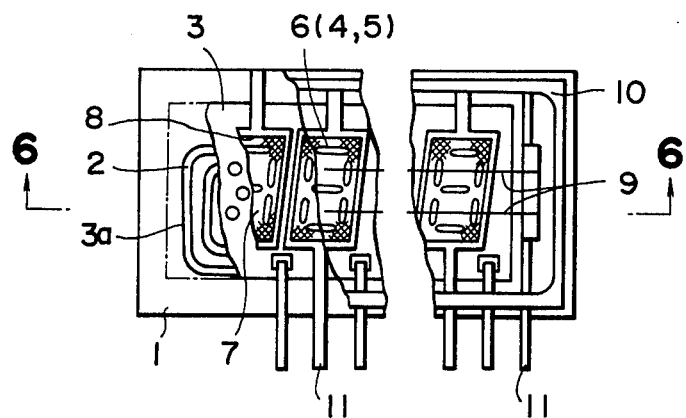
FIG. 5 is a partially cutaway plan view showing the essential portion of a fluorescent display tube according to the present invention.
Figure 6:
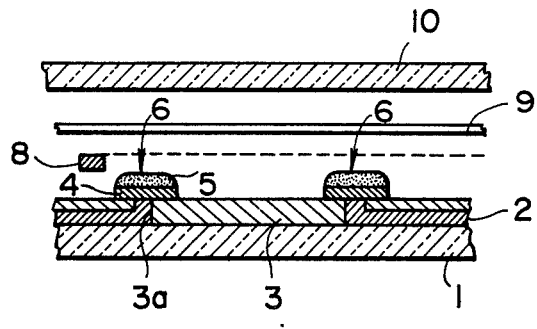
FIG. 6 is an enlarged sectional view taken along line 6—6 of FIG. 5 which shows the essential portion of the fluorescent display tube.

FIG. 5 is a partially cutaway broken plan view showing the essential portion of an embodiment of a fluorescent display tube according to the present invention, and FIG. 6 is an enlarged sectional view showing the essential portion of the display tube of FIG. 5.

The fluorescent display tube shown in FIGS. 5 and 6 includes a substrate 1 formed of an insulating material such as glass, ceramic or the like, and conductive wirings 2 deposited on the substrate 1. The conductive wirings 2 are covered with an insulating layer 3 formed with through-holes 3a at the predetermined portions thereof. Disposed on the insulating layer 3 are anode conductors 4 which are electrically connected through the holes 3a to the corresponding conductive wirings 2, respectively.

In the illustrated embodiment, the fluorescent display tube is constructed so that a display is observed through a cathode. On the contrary, when constructing the display tube to observe a display through the substrate 1, the conductive wirings 2 and anode conductors 4 are formed of a transparent conductive film and the insulating layer 3 is formed with openings corresponding to the shape of the anode conductors 4.

The anode conductors 4 are arranged in the shape of the letter "8" to display any one of numerals "0" to "9". The anode conductors 4 have a fluorescent material layer 5 deposited thereon to form segment anodes 6. The fluorescent material layer 5 is formed of a low speed electron excited fluorescent material which comprises a ZnO:Zn fluorescent component and an additive component such as W or the like. In the illustrated embodiment, seven segment anodes 6 are arranged in the shape of the letter "8" to form one-digit pattern display section 7. When adding a large amount of the additive component in the range of not exceeding 50 wt.% to the fluorescent component to improve the luminous contrast of a display, it is preferable to add a suitable pigment to a material of the insulating layer 3 to darken the insulating layer.

The fluorescent display tube further includes a control electrode 8 in a mesh form disposed above the pattern display section 7 so as to oppose thereto and a filamentary cathode 9 heated to emit electron. Reference numeral 10 designates a front cover formed in the shape of a tray, which is hermetically sealed to the periphery of the substrate 1 to form a vacuum casing. Reference numera 11 designates external leads.

The following examples illustrate manufacturing of the segment anodes 6 of the fluorescent display tube according to the present invention having the construction mentioned above, and comparison in luminance and shelf characteristics at a high temperature which is one of temperature characteristics between the fluorescent display tube of the present invention and a conventional one.

EXAMPLE 1

A fluorescent material was prepared by mixing a powder of a ZnO:Zn fluorescent component with WO₃ powder (average particle size of 3 μm) of 7 wt.% based on the fluorescent component. A vehicle was prepared by dissolving 3% of ethyl cellulose in butyl carbitol. 40 wt.% of the vehicle was added to 60 wt.% of the fluorescent material to form a mixture and then the mixture was kneaded to prepare a fluorescent material paste. The paste was applied on the segment anodes 4 shown in FIG. 4 according to a screen printing procedure to form a fluorescent display tube of the present invention.

The luminance and shelf characteristics at a high temperature of the present fluorescent display tube are shown in Table 1 as well as those of a conventional fluorescent display tube manufactured using a fluorescent material in which WO₃ is not contained.

As seen from Table 1, the fluorescent display tube of the present invention is significantly improved in luminance, emits light of a uniform luminance and is substantially improved in shelf characteristics at a high temperature, as compared to the conventional one.

EXAMPLE 2

20 g of a ZnO:Zn fluorescent component was added to a solution obtained by dissolving 120 mg of para-ammonium wolframate in 120 g of pure water to prepare a homogeneous mixture. 130 ml of isopropylalcohol was added to the mixture while stirring, to allow the para-ammonium wolframate to be deposited on the surface of the fluorescent component. Then, the fluorescent component was taken out by filtration, dried and calcined to obtain a fluorescent material composed of the fluorescent component having a material mainly consisting of $WO_3$ applied on the surface thereof.

Fluorescent display tubes of the present invention were manufactured using this fluorescent material, and luminance and shelf characteristics at a high temperature of the present fluorescent display tubes were measured according to the procedure described in Example 1. The results are shown in Table 2.

EXAMPLE 3

Example 2 was substantially repeated except that para-ammonium molybdate was used instead of para-ammonium wolframate, to prepare a fluorescent material composed of a ZnO:Zn fluorescent component having a material mainly consisting of $MoO_3$ deposited on the surface thereof. Fluorescent display tubes were manufactured using this fluorescent material and subjected to a test as in Example 2. The substantially same results as shown in Table 2 were obtained.

In the examples explained hereinbefore, only the shelf characteristics at a high temperature were considered as temperature characteristics of a fluorescent display tube. However, further tests by the inventor have shown that the fluorescent display tube of the present invention is superior in operating characteristics at a high temperature to the conventional one.

In addition, further experiments by the inventor have shown that a fluorescent material composed of a ZnO:Zn fluorescent component having V or any oxide thereof added thereto is improved in luminance and temperature characteristics in the substantially same manner as the above-mentioned fluorescent material composed of the fluorescent component having W, Mo or any oxide thereof added thereto.

The examples as explained hereinbefore illustrate the fluorescent display tubes using the low speed electron excited fluorescent material of the present invention. However, it is of course that the fluorescent material of the present invention is applicable to other display devices such as a plasma display device and the like. For example, in the plasma display device, the fluorescent material can be used to accomplish a color-display utilizing low speed electrons which are generated in a gas plasma formed in the plasma display device.

As explained hereinbefore, the low speed electron excited fluorescent material of the present invention comprises a ZnO:Zn system fluorescent component and at least one component selected from the group consisting of W, Mo, V and their oxides added to the fluorescent component. The additive component such as W added to the fluorescent component serves to clean the surface of the fluorescent component, so that the fluorescent material may be substantially improved in luminance, decreased in unevenness of luminance and improved in temperature characteristics at a high temperature. Further, a larger amount of the additive component added to the fluorescent component allows the surface of the fluorescent material to be darkened to significantly improve the luminous contrast of the fluorescent material.

Furthermore, the fluorescent display tube manufactured using the low speed electron excited fluorescent material is improved in luminous characteristics and temperature characteristics, so that it may be used in the bright and/or high temperature environment. Thus, it will be understood that the fluorescent display tube is applicable to a wider range of fields.

While preferred embodiments of the invention have been described with a certain degree of particularity, obvious modifications and variations are possible in light of the above teachings. It is therefore to be understood that within the scope of the appended claims, the invention may be practiced otherwise than as specifically described.

TABLE 1

| [4] | Luminance (ft. L) | | | Shelf Characteristics at High Temperature | | |
|---|---|---|---|---|---|---|
| | | | | Initial[1] Luminance (ft. L) | Luminance[2] after Shelf (ft. L) | Luminance[3] Ratio (%) |
| | Average | Maximum | Minimum | | | |
| Present fluorescent display tube | 750 | 950 | 700 | 750 | 640 | 85.3 |
| Conventional fluorescent display tube | 550 | 650 | 300 | 550 | 300 | 54.5 |

[1] luminance measured prior to a shelf test at a high temperature
[2] luminance measured after exposing fluorescent display tubes to a temperature of 80° C. for 72 hours without operating the tubes.
[3] Ration of luminance after shelf to initial luminance
[4] The present fluorescent display tubes and the conventional ones subjected to the test were ten in number, respectively, and had a structure as shown in FIG. 5 except the fluorescent material. The test was carried out under the conditions of applying a voltage of 12V to the anodes and control electrode, respectively, and applying a voltage of 1.7V to the cathode.

TABLE 2

| | Luminance (ft. L) | | | Shelf Characteristics at High Temperature | | |
|---|---|---|---|---|---|---|
| | | | | Initial Luminance (ft. L) | Luminance after Shelf (ft. L) | Luminance Ratio (%) |
| | Average | Maximum | Minimum | | | |
| Present fluorescent display tube | 800 | 1000 | 750 | 800 | 680 | 85 |

TABLE 2-continued

| | Luminance (ft. L) | | | Shelf Characteristics at High Temperature | | |
| --- | --- | --- | --- | --- | --- | --- |
| | | | | Initial Luminance (ft. L) | Luminance after Shelf (ft. L) | Luminance Ratio (%) |
| | Average | Maximum | Minimum | | | |
| Conventional fluorescent display tube | 550 | 650 | 300 | 550 | 300 | 54.5 |

What is claimed is:

1. A low speed electron excited fluorescent material comprising a ZnO-Zn fluorescent component excited by law speed electrons impinging thereon to emit light and at least one additive component selected from the group consisting of W, Mo, V and their oxides which is added to said fluorescent component.

2. A low speed electron excited fluorescent material as defined in claim 1, wherein said additive component is added to said fluorescent component in amount of 0.1-50 wt.% based on said fluorescent component.

3. A fluorescent display tube comprising an anode having a fluorescent material layer deposited on the upper surface thereof and a filamentary cathode for emitting electrons which impinge on said fluorescent material layer to allow it to emit luminous light, wherein said fluorescent material layer is composed of a ZnO:Zn fluorescent component excited by low speed electrons impinging thereon to emit light and at least one additive component selected from the group consisting of W, Mo, V and their oxides which is added to said fluorescent component.

4. A fluorescent display tube as defined in claim 3, wherein said additive component is added to said fluorescent component in amount of 0.1-50 wt.% based on said fluorescent component.

5. A fluorescent display tube as defined in claim 3 or 4, wherein said fluorescent material layer is disposed through said anode on a darkened substrate.

* * * * *